July 3, 1962 R. V. SMITH 3,042,068
SAFETY RELIEF VALVE
Filed April 23, 1959
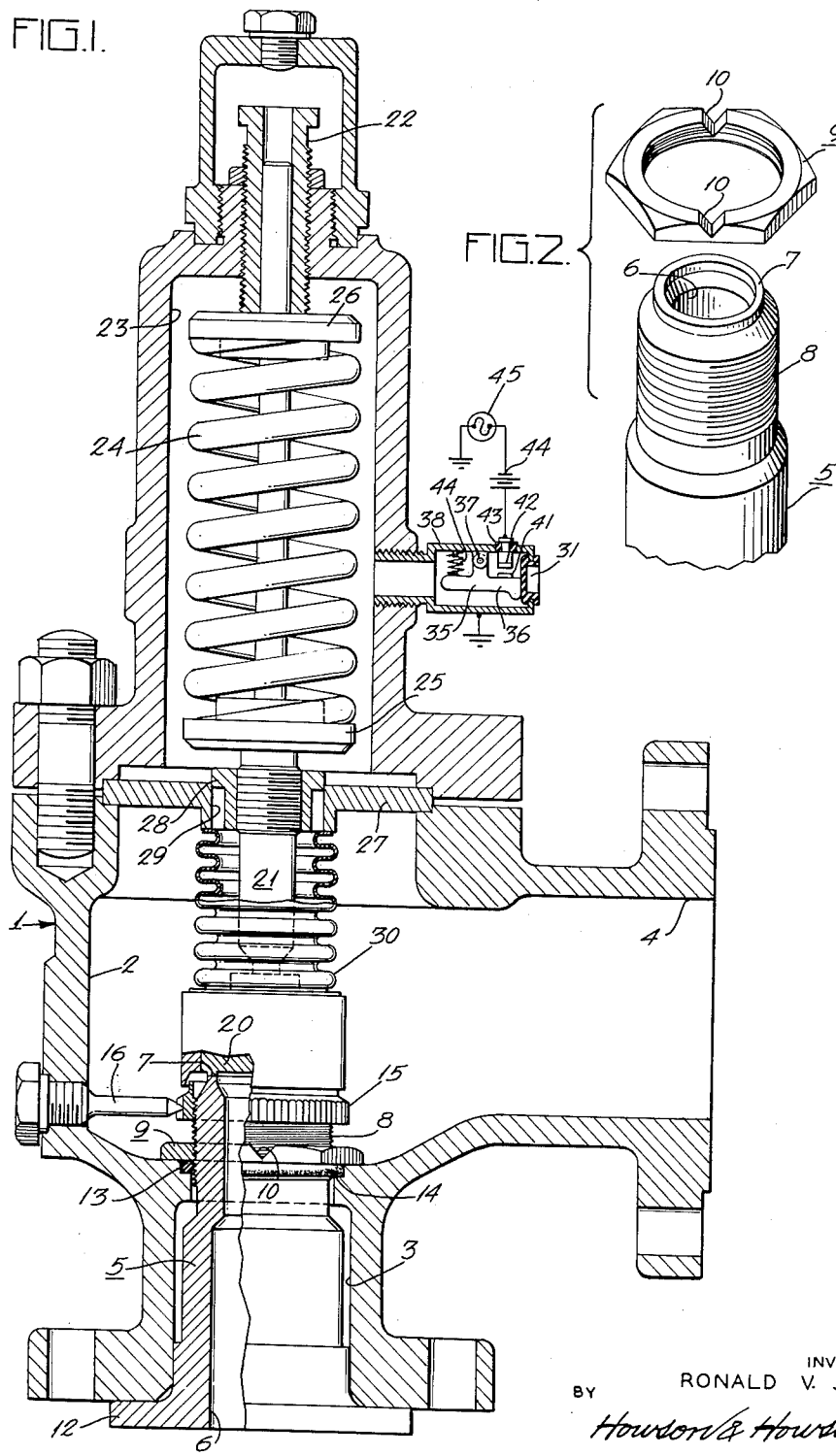
INVENTOR:
RONALD V. SMITH
BY
Howson & Howson
ATTYS.

3,042,068
SAFETY RELIEF VALVE
Ronald V. Smith, Pennsauken, N.J., assignor to J. E. Lonergan Company, Philadelphia, Pa., a corporation of Pennsylvania
Filed Apr. 23, 1959, Ser. No. 808,455
5 Claims. (Cl. 137—315)

The present invention relates to safety-relief valves, and has particular application to valves for use on hydro carbon chemical plants and similar installations where "coking" and/or corrosive fluids are handled.

The primary object of the present invention is to provide a safety-relief valve having a construction affording ready removal of the valve nozzle and seat for repair of the damaged seat surfaces.

Prior to the present invention, valve nozzles were threaded into the valve casing and were removed by unthreading the nozzle from the casing. Many fluids, particularly corrosive fluids, cause "coking," rusting, or corrosion, particularly in the area of the nozzle thread, so that the nozzle becomes frozen or rigidly secured to the threaded casing. When this occurred, it was necessary to spend considerable time to remove the nozzle and not infrequently, the removal of the nozzle damaged it beyond repair. As a consequence of this not infrequently safety-relief valves in such installations are permitted to remain with damaged seats which cause leakage and inefficient operation, or attempts are made to repair the damaged nozzle in place within the valve body or casing. In order to provide a good seat in the nozzle, the seat must be machine lapped, which can only be done by removal of the nozzle from the casing.

With the foregoing in mind, the present invention provides a nozzle which is readily removed from the valve casing by mounting the nozzle in the casing with a frangible fastener which is readily split or broken to afford removal of the nozzle from the body.

The present invention also provides a nozzle which, by reason of its ready removal, may be fabricated of less expensive material since its replacement is relatively simple when the nozzle becomes damaged or when the character of the fluid being handled is changed.

Another important object of the present invention is to provide an improved valve construction embodying a bellows or diaphragm intermediate the valve element and the spring chamber to seal the latter from the fluid passing through the valve opening, said spring chamber including pressure relief means for discharging pressure in the spring chamber upon occurrence of a rupture or other leakage in the bellows or diaphragm. The invention provides a signal operated upon displacement of the pressure relief means in the spring chamber to thereby visibly, audibly or otherwise indicate a failure in the bellows or diaphragm.

All of the objects of the present invention and the various features and details of construction and operation thereof are more fully set forth hereinafter with reference to the accompanying drawing wherein:

FIG. 1 is a section through a pressure relief valve empodying the present invention; and FIG. 2 is a detached perspective view of the valve nozzle and its associated frangible fastener.

Referring now to the drawing, a valve made according to the present invention comprises a valve body 1 in which is formed a main chamber 2, an inlet duct 3 and an outlet or discharge duct 4. The outlet duct 4 is in direct communication with the main chamber 2 while the inlet duct 3 has mounted therein a valve nozzle 5 having a lower flange 12 and a central bore 6 terminating at its upper end in a valve seat 7. The upper portion of the nozzle is exteriorly threaded as is indicated at 8 to receive a frangible fastener 9, for example a nut having weakened areas 10, in the present instance at diagonally opposite points about its periphery (see FIG. 2). Tightening the fastener 9 on the threaded portion 8 draws the lower flange 12 of the nozzle tightly against the bottom of the valve body 1 and also effects a seal between the main chamber 2 and the duct 3 surrounding the valve nozzle. In the present instance, the seal is effected by a sealing element 13 seated in a recess 14 in the valve body and operable to be pressed by the fastener 9 into the threads of the threaded portion 8.

In accordance with the invention, the frangible fastener 9 may be readily broken, for instance at the weakened areas 10 and separated from the threaded portion 8 to permit the nozzle 5 to be displaced axially downward through the inlet duct 3. It is noted that the outside diameter of the nozzle diminishes in steps from the lower end toward the valve seat, so that it may readily be displaced downwardly through the inlet duct. If the nozzle becomes lodged in the valve body, it may be knocked free by placing a lead block or other protective device on the top of the nozzle and driving it down through the inlet duct after removal of the valve superstructure. Upon displacement of the nozzle, it may be removed and any damage to the nozzle may be repaired prior to replacing the same and remounting in the valve body by means of a new frangible fastener. A warn ring 15 is mounted on the threaded portion 8 in conventional manner for axial adjustment. The ring is retained in adjusted position by a pin 16, but it is removed when dismounting the nozzle.

A valve disc is mounted in the body for axial displacement relative to the nozzle into and out of engagement with the valve seat 7, and is biased into engagement with the seat with a predetermined force so as to be displaced from said seat when the pressure in the bore 6 exceeds the desired maximum value. As shown in the drawing, a valve disc 20 is mounted at the lower end of a stem 21 which is guided for axial displacement in a bushing 22 in the upper end of the spring chamber 23. A spring 24 is compressed between a flange 25 on the stem 21 and a complementary flange 26 on the bushing 22. A partitioning wall 27 separates the spring chamber 23 from the main chamber 2 and a balancing bushing 28 is mounted on the stem 21 to cooperate with a central aperture 29 in the partition 27. To preclude flow of fluid from the main chamber 2 through the aperture 29 when the valve element 20 is elevated, a diaphragm 30 is mounted in sealing engagement with both the partition 27 and valve element 20 to enclose the stem 21. In the present instance, the diaphragm is in the form of a flexible bellows which may serve to assist in guiding the valve element 20 to its seat upon closure of the valve. In the event of failure of the bellows 30, pressure relief means is provided in the spring chamber 23 to vent the same to atmosphere. In the present instance, the pressure relief means takes the form of a blow-out disc 31 which operates in a conventional manner to vent the spring chamber 23.

In accordance with the invention, a signal device is provided to operate when the pressure builds up in the spring chamber 23. In the present instance, a signal device 45 is operated by a switch 35 responsive to displacement of the blow-out disc 31. The switch 35 comprises a switch arm 36 pivoted as indicated at 37 to a casing extension 38 mounted in the spring chamber 23 and carrying the blowout disc 31. The switch arm 36 carries a contact 41 cooperable with a fixed contact 42 mounted in the extension 38 by an insulator 43. As shown in FIG. 1, the switch arm 36 is biased into engagement with the blow-out plug 31 by means of a spring 44, and the blow-out plug 31 normally holds the arm 36 to maintain the contact 41 out of engagement with the contact element 42. Upon build-up of pressure in the spring chamber 23, for example, upon rupture or other failure of the bellows 30, the plug 31 is displaced outwardly permitting the arm 36 to move under the bias of the spring 44 towards the fixed contact 42 and establish contact between the contacts 41 and 42. This completes a circuit through a voltage source 44 and the signal device 45.

In the present instance, the signal device takes the form of a lamp which is preferably mounted on the valve body 1 with a self-contained voltage source in the form of a battery. Of course, other electrical signal devices may be used and an external voltage source may be substituted for the battery 44. If a mechanical signal device is desired, a trigger mechanism responsive to increased pressure in the spring chamber may be employed in the place of the switch 35. The signal device 45 may be located in a control tower for the entire plant under the surveillance of the plant operator if the valve is normally inaccessible. Thus, the present invention provides an indicator which shows when the bellows fails due to rupture or other defect whereby the defect may be corrected before excessive damage occurs.

While a particular embodiment of the present invention has been herein illustrated and described, it is not intended to limit the invention to such disclosure, but changes and modifications may be made therein and thereto within the scope of the following claims:

I claim:

1. A valve comprising a valve body defining a main chamber, and inlet and outlet ducts thereto, a valve nozzle mounted in said inlet duct and having a bore terminating in a valve seat within said main chamber, said valve nozzle having a smaller diameter than said inlet duct for a major portion of its length adjacent said main chamber and engaging said inlet duct in a localized area remote from said main chamber, the outside dimension of said nozzle diminishing from said area of engagement toward the valve seat, means defining a recess in said inlet duct adjoining said main chamber, a sealing element mounted in said recess and operable to bridge the clearance between said inlet duct and said valve nozzle adjoining said main chamber to prevent passage of fluid from said main chamber into the clearance space intermediate said nozzle and said inlet duct, and a frangible nut threaded on said valve nozzle to engage said valve body and compress said sealing element into sealing engagement with the valve body and the nozzle and retain said valve nozzle in firm engagement with said valve body, said frangible nut having diagonally-opposed weakened areas affording ready rupture of said nut in said area for easy removal of said nut from engagement with said valve nozzle whereby upon removal of said nut, said nozzle may be displaced from said inlet duct by a purely axial force on said nozzle outwardly from said main chamber.

2. A valve comprising a valve body defining a main chamber, and inlet and outlet ducts thereto, an elongated valve nozzle mounted in said inlet duct and having an elongated bore coextensive with said duct to serve as an inlet conduit for said valve, said nozzle engaging said valve body in an area solely exteriorly of said main chamber and terminating in a valve seat within said main chamber, means sealing said area of engagement from said main chamber, and frangible fastening means disposed within said main chamber and engaging said valve nozzle to secure the same in said inlet duct, said fastening means being operable upon rupture and removal thereof to afford axial displacement of said nozzle from said inlet duct by a purely axial force on said nozzle, a valve element mounted for displacement axially of said nozzle, and guide means for guiding said valve element into engagement with said seat.

3. A safety valve comprising a valve body defining a main chamber, and inlet and outlet ducts thereto, an elongated valve nozzle having a bore serving as an inlet conduit for said valve, said nozzle engaging said valve body in an area solely exteriorly of said chamber and terminating in a valve seat within said main chamber, means sealing said area of engagement from said main chamber, a frangible fastening means mounting said valve nozzle in said inlet duct and operable upon rupture and removal thereof to afford axial displacement of said nozzle from said inlet duct by a purely axial force on said nozzle, a valve element mounted for displacement axially of said nozzle, and means biasing said valve element into engagement with said seat with a predetermined force against the inlet pressure of said valve, said valve element being subjected to said biasing force on one side, and the inlet pressure force on the other side, whereby upon build-up of pressure beyond a given value in the bore of said nozzle, said valve element is displaced against said bias away from said seat to afford flow and relief of pressure through said valve nozzle into said main chamber and said outlet duct.

4. A valve comprising a valve body defining a main chamber, and inlet and outlet ducts thereto, an elongated valve nozzle mounted in said inlet duct and having an elongated bore coextensive with said duct to serve as an inlet conduit for said valve, and terminating at one end in a valve seat within said main chamber, a flange at the opposite end of said nozzle engaging against the valve body, the exterior of said nozzle adjacent said seat being threaded, and frangible fastening means comprising a nut having diagonally-opposed weakened areas affording ready rupture thereof threadably engaged with said threaded portion of the nozzle within said main chamber and bearing against said valve body to retain the nozzle in said inlet duct, said fastening means being operable upon rupture and removal thereof to afford axial displacement of said nozzle from said inlet duct by a purely axial force on said nozzle, a valve element mounted for displacement axially of said nozzle, and guide means for guiding said valve element into engagement with said seat.

5. A valve according to claim 4 including a sealing element between said nozzle and said valve body engaged and compressed by said nut to prevent passage of fluid from said main chamber into the space intermediate said nozzle and said valve body inlet duct.

References Cited in the file of this patent

UNITED STATES PATENTS

| | | |
|---|---|---|
| 414,519 | Gladding | Nov. 5, 1889 |
| 1,740,420 | Friedman | Dec. 17, 1929 |
| 2,661,753 | Stroop | Dec. 8, 1953 |
| 2,698,000 | Rainsbury | Dec. 28, 1954 |
| 2,699,801 | Schleyer | Jan. 18, 1955 |
| 2,832,372 | Farris | Apr. 29, 1958 |